March 18, 1947. D. R. ZUCK 2,417,725
COMBINED FLIGHT AND GROUND CONTROL FOR AIRPLANES
Filed Nov. 22, 1941 3 Sheets-Sheet 2
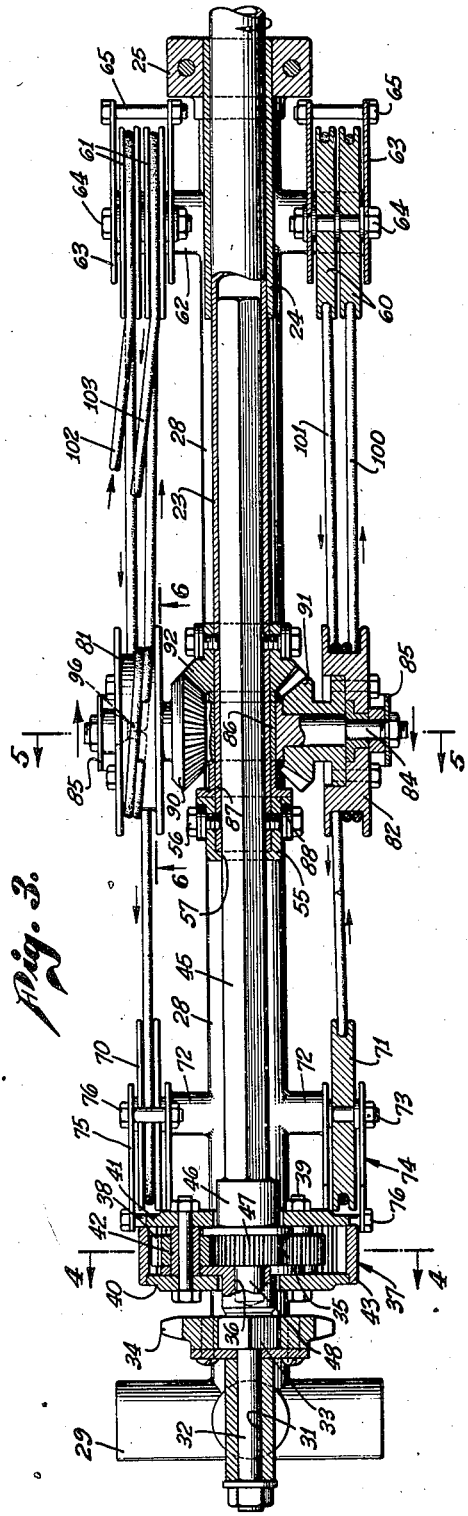
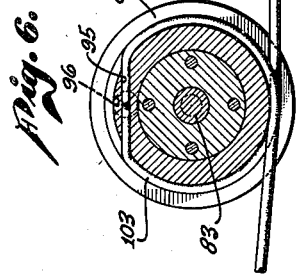
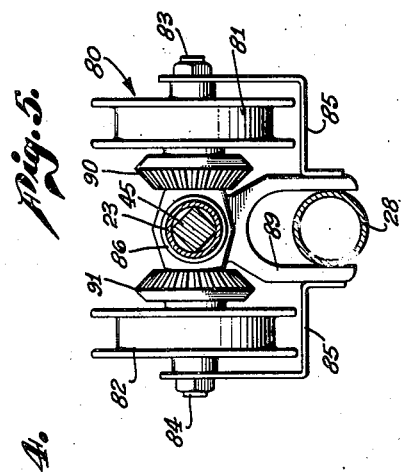
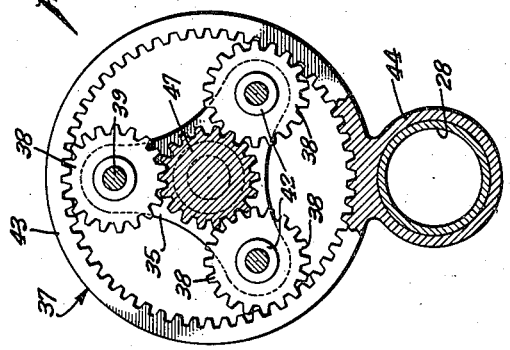
DANIEL R. ZUCK,
INVENTOR
ATTORNEY.

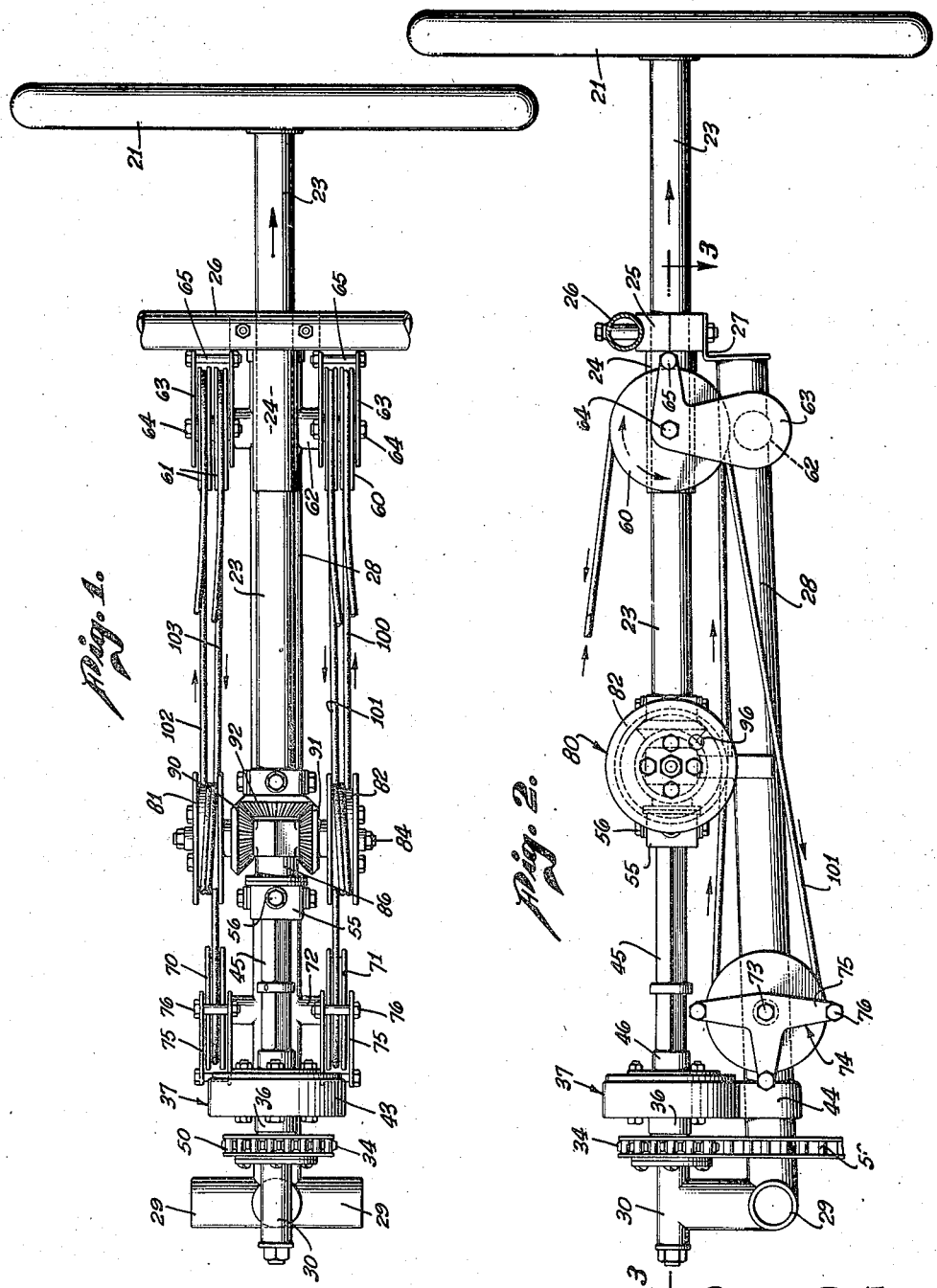

March 18, 1947. D. R. ZUCK 2,417,725
COMBINED FLIGHT AND GROUND CONTROL FOR AIRPLANES
Filed Nov. 22, 1941 3 Sheets-Sheet 3

DANIEL R. ZUCK,
INVENTOR

BY
ATTORNEY

Patented Mar. 18, 1947

2,417,725

UNITED STATES PATENT OFFICE 2,417,725

COMBINED FLIGHT AND GROUND CONTROL FOR AIRPLANES

Daniel R. Zuck, San Diego, Calif.

Application November 22, 1941, Serial No. 420,094

8 Claims. (Cl. 244—83)

This invention relates to airplanes and particularly to an airplane control whereby the flight control surfaces may be operated, and the ground wheels steered, from a unitary pilot's control wheel.

My invention is applicable to any type of aircraft wherein flight control is accomplished by operation of surfaces, such as ailerons, elevators, rudders and the like and ground directional control is accomplished by the manipulation of wheels, skiis, rudders, etc. By the term "ground" I intend to include water and other surfaces of the earth.

An application of my invention where it is particularly useful is in roadable airplanes, such for example as shown in my copending applications Serial No. 246,153, filed December 16, 1938, for Airplane with non-stalling and glide angle control characteristics, and Serial No. 249,957, filed January 9, 1939, for Folding wings on aircraft.

It is an object of my invention to provide a unitary pilot's control, for flight, and for steerable ground wheels or other ground supporting devices.

It is a further object of my invention in connection with such a control, to incorporate a rotatable telescoping shaft and steering wheel which can be manipulated by the pilot for flight control, and in which the longitudinal extension of the shaft will not affect the ground wheel control, so that in taking off, landing, or ground touring, the ground wheels can be steered irrespective of the positions of ailerons or other flight control surfaces.

It is a still further object of my invention to provide in a device of this character a differential flight control means, whereby the pilot's wheel may be shifted longitudinally for climbing or descending, and turned for change in horizontal direction, and a compound of both control effects be obtained by simultaneously shifting the wheel longitudinally and turning it, for example, to bank and climb at the same time.

My invention may be adapted to various types and arrangements of flight control surfaces, and steerable ground wheels or elements located either fore or aft, singly or in multiple.

I have chosen for illustration a roadable airplane of the general type shown in my aforesaid copending applications.

In the drawings:

Figure 1 is a top plan view of my control.

Figure 2 is a side elevation of the control with the pilot's wheel in a different position.

Figure 3 is a sectional view taken on the line 3—3 of Figure 2.

Figure 4 is a fragmentary section of a ground wheel steering gear box taken on the line 4—4 of Figure 3.

Figure 5 is a fragmentary section of the flight control differential elements taken on the line 5—5 of Figure 3.

Figure 6 is a fragmentary section of one of the cable pulleys, taken on the line 6—6 of Figure 3.

Figure 7:
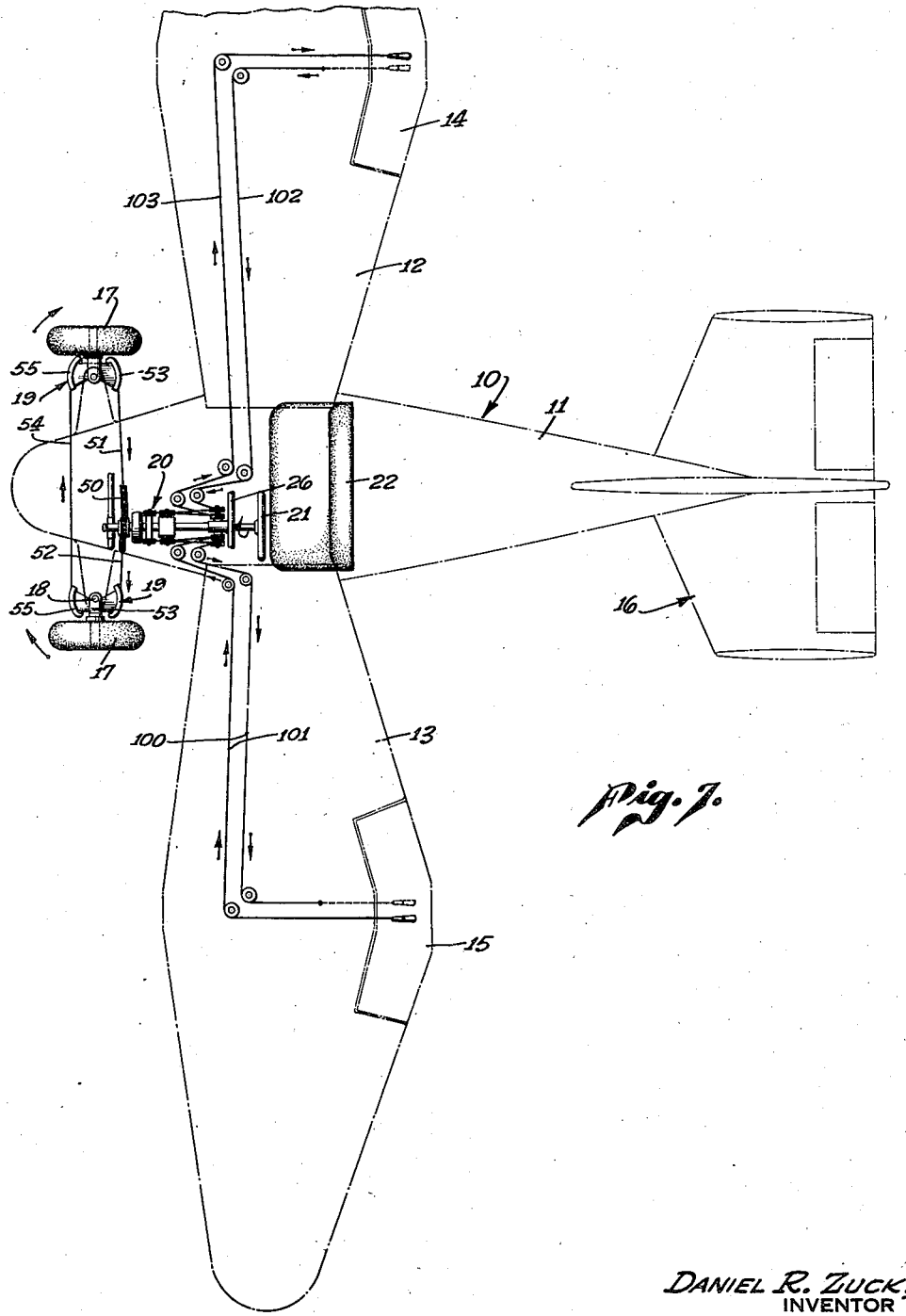
Figure 7 is a diagrammatic plan view of an airplane illustrating an application of my invention.

In various views, some of the cables are illustrated as coming off pulleys at an angle. This is for clarity of illustration; it being understood that in the application of my invention, accepted mechanical design is to be applied, and that where idle guide pulleys or other conventional elements are indicated by experience to be necessary, they are to be considered as contemplated in the use of my invention. Also, the chain described in connection with the steering of the wheels, is crossed to provide for response of the wheels to the direction of rotation of the pilot's wheel.

Referring to Figure 7, an airplane 10 is shown, comprising a fuselage 11, a right wing 12, a left wing 13, right and left flight control surfaces 14 and 15, and a tail assembly 16. In the type of plane shown, flight control in all directions is accomplished through the control surfaces 14 and 15. Ground or road wheels 17 are mounted upon spindles 18, and are rotatable upon the axes of the spindles by means of bell cranks 19. The control surfaces and the wheels are manipulated through cables and chain hereinafter identified, by my control device 20, which includes a pilot's wheel 21 suitably located in reference to a pilot's seat 22.

The control 20 is illustrated in detail in Figures 1 to 6.

The wheel is rigidly mounted upon a hollow shaft member 23 which is rotatably and slidably supported in a bearing 24. This bearing is secured by a clamp 25 which is mounted upon a bar 26, the latter being suitably designed as a part of the frame, not illustrated, or otherwise made a stationary part of the fuselage.

The clamp 25 holds a bracket 27, which in turn supports a guide bar 28 at its upper end. The guide bar is secured at its lower end to a cross member 29 which may be mounted on the fuselage frame (not illustrated).

Extending upwardly from the member 29 is a T support 30 which provides a bearing 31 for a spindle 32 at the lower end of the control.

The spindle 32 is formed with a hexagonal head 33 upon which is mounted a sprocket 34. Extending from the hexagonal head 33 is a flange member 35 having a hollow bore 36 and which forms a part of a reduction gear generally designated by the numeral 37. The flange member 35 is in the form of a spider as more clearly illustrated in Figure 4 and has three small gears 38 mounted upon it for free rotation through the agency of stub shafts or bolts 39. These bolts pass through circular end plates 40 and 41 which are separated by spacing sleeves 42. A ring gear 43 encloses the gear 38 with which it meshes; and the ring gear 43 is provided with a mounting 44 by which it is secured in a stationary manner upon the post or bar 28.

A squared shaft 45 having a thrust head 46 terminates in a gear 47 meshing centrally with the gears 38, and a stub shaft 48 bearing in the bore 36 of the spider 35. Rotation of the shaft 45 through the reduction gear assembly 37 thus results in rotation of the sprocket 34 at reduced speed.

The shaft 45 is rotated by the wheel 21 by means subsequently described.

A chain 50 is trained over the sprocket 34, and cables 51 and 52 connect between the ends of the chain and segments 53 on the wheel bell cranks 19. A cable 54 is maintained between wheel bell crank segments 55 to stabilize the relative positions of the wheels.

It is thus clear that rotation of the pilot's wheel 21 results in a steering force being applied through the agencies described, to the ground or road wheels 17.

The operative connection between the hollow shaft member 23 and the square shaft 45 is provided by a collar 55 which is secured to the lower end of the member 23 by means of cap screws 56 or any other desired attachments, the collar having a squared bore 57 which slidably engages the square shaft 45. Rotative movement of the steering wheel 21 is thus imparted to the shaft 45 regardless of the position of the pilot's wheel 21 longitudinally within its limit of movement. If desired, roller bearings or any other form of friction reducing bearing (not illustrated) may be incorporated in the collar 55a.

Referring now to that part of the control mechanism which is used for directing flight, the control is designed so that longitudinal shifting of the pilot's wheel 21 will result in equalized up or down pivoting of the control surfaces 14 and 15, and rotation of the pilot's wheel will result in a differential pivoting of such control surfaces, so that a compound operation of flight control is achieved by simultaneously shifting the pilot's wheel longitudinally and turning it, which results in a primary pivoting of the control surfaces either up or down, with a secondary differential adjustment of such control surfaces. The mechanism for accomplishing this will next be described.

A pair of independent double pulleys 60 and 61 are mounted for free rotation on lateral extensions 62 of the bar 28, one on each side of the sleeve. The mounting is effected by brackets 63 extending upwardly from the bar 28 and mounting pulley shafts 64 horizontally parallel to the shaft member 23. The brackets also include a guard bolt 65 to prevent cables from slipping off the pulleys.

A pair of single pulleys 70 and 71 are mounted for free rotation on lateral extensions 72 near the lower end of the bar 28, these extensions mounting pulley shafts 73 and guard members 74, the latter comprising brackets 75 and guard bolts 76.

A differential mechanism generally designated by the reference numeral 80 is provided intermediate the pulleys 60 and 61 at the upper end, and 70 and 71 at the lower end, of the bar 28.

This differential mechanism comprises a pair of pulleys 81 and 82 mounted for rotation upon pulley shafts 83 and 84, respectively. The latter are mounted at their outer ends upon brackets 85, and at their inner ends merge into a common sleeve 86 which rotatably bears upon the steering shaft member 23. This sleeve 86 is formed with a thrust flange 87 which bears against a face 88 of the collar 55. The sleeve 86 is also formed with a yoke 89 which slidably engages the bar 28 to prevent rotation of the sleeve. The brackets 85 should be welded to the yoke to increase rigidity of the mounting of the pulley shaft assembly.

Gears 90 and 91 are also mounted upon the pulley shafts 83 and 84 respectively, and are keyed by capscrews to their respective pulleys to turn the pulleys. These gears 90 and 91 are differentially rotated by a gear 92 which is secured by capscrews upon the shaft 23. The lower end of the gear 92 makes a thrust engagement with the sleeve 86.

The pulleys 81 and 82 are twins. Each is formed with a cable anchor, in the form of a hole 95 extending tangentially below the face of the groove, through which the cable may be passed. An opening 96 communicates externally with the hole 95, and when the cable is in position, solder may be poured through the hole 96, or the latter may be tapped and a set screw (not illustrated) sent in to secure the cable. Any other equivalent means of anchoring the cable may be employed.

A cable, effectively separated by the cable anchor into two cables, 100 and 101 are trained over the pulleys on the right side of the control, and similar cables 102 and 103 over the pulleys on the left side. These cables lead from the control to their respective right and left flight control surfaces, and are suitably attached thereto above and below the control surfaces 14 and 15 to pivot the latter up or down in a manner understood in the art.

Thus, for elevating the control surfaces, it is necessary to relatively shorten the cables 101 and 103 and lengthen the cables 100 and 102. For lowering the control surfaces, the opposite relationship must be established.

The cables 100 and 102 are wrapped around the outer of the double pulleys 60 and 61 and effectively terminate at the intermediate pulleys 81 and 82. The cables 101 and 103 are wrapped around the inner of the double pulleys 60 and 61, passed thence around the lower single pulleys 70 and 71 and effectively terminate at the intermediate pulleys 81 and 82.

It is preferable that all cables be given a wrap or two around their respective intermediate pulleys 81 and 82 to give purchase.

Assuming that the pulleys 81 and 82 are held against rotation, which is controlled by the pilot's wheel, a shifting of the pilot's wheel rearwardly will shorten the span between the intermediate and rear pulleys, and lengthen the span between the intermediate and forward pulleys. This has the effect of shortening cables 101 and 103, and lengthening cables 100 and 102, which will cause the control surfaces to be elevated which will cause the airplane illustrated to climb. A forward movement of the pilot's wheel will have the opposite result.

When the anchor of the cables on the intermediate pulleys is differentially displaced by turning the pilot's wheel, one cable is shortened while the corresponding opposite cable is lengthened, relatively, and banking of the plane is accomplished. This banking may be compounded with either climb or descent by rearward or forward movement of the pilot's wheel while turning it.

Having described my invention, what I claim as new and desire to secure by Letters Patent is:

1. A combined flight and ground control for airplanes comprising: a rotatable shaft, means transmitting rotary motion of said shaft to one or more ground wheels for steering same, manually operated means to rotate said shaft including a sleeve slidably but non-rotatably mounted on said shaft, oscillatable members mounted on said sleeve transmitting a simple sliding motion of said sleeve to operate flight control surfaces with identical movements, and means to oppositely rotate said oscillatable members to oppositely operate said flight control surfaces.

2. A combined flight and ground control for airplanes comprising: a rotatable shaft, means including reduction gearing transmitting rotary motion of said shaft to one or more ground wheels for steering same, manually operated means to rotate said shaft including a sleeve slidably but non-rotatably mounted on said shaft, and oscillatable members mounted on said sleeve transmitting a simple sliding motion of said sleeve to operate flight control surfaces with identical movements, and means to oppositely rotate said oscillatable members to oppositely operate said flight control surfaces.

3. A combined flight and ground control for airplanes comprising: a rotatable shaft, means transmitting rotary motion of said shaft to one or more ground wheels for steering same, means transmitting rotary motion of said shaft to oppositely operate flight control surfaces said means including a sleeve slidably but non-rotatably mounted on said shaft, a set of oscillatable members mounted on the sleeve cables anchored to the oscillatable members, and gears associated with said sleeve and oscillatable members oppositely rotating said oscillatable members, and manually operated means to rotate said shaft.

4. A combined flight and ground control for airplanes comprising: a rotatable shaft, means transmitting rotary motion of said shaft to one or more ground wheels for steering same, manually operated means to rotate said shaft including a sleeve slidably but non-rotatably mounted on said shaft, and means coupled with said sleeve transmitting a simple sliding motion of said sleeve to operate flight control surfaces with identical movements or transmitting a compound sliding motion of said sleeve and a rotation of the same to differentially operate said flight control surfaces, said last named means including a pair of guide pulleys rotatably mounted in a fixed position, a complementary set of pulleys rotatably mounted on the sleeve and adapted to slide therewith to vary the separation of the two sets of pulleys, cables passing over both sets of pulleys, one end of the cables being anchored on the slidable pulleys and the other end leading to the flight control surfaces, and means operated by rotation of the sleeve to oppositely shift the point where the cables are anchored.

5. A combined flight and ground control for airplanes comprising: a rotatable shaft, means transmitting rotary motion of said shaft to one or more ground wheels for steering same, manually operated means to rotate said shaft including a sleeve slidably but non-rotatably mounted on said shaft, and means coupled with said sleeve transmitting a simple sliding motion of said sleeve to operate flight control surfaces with identical movements or transmitting a compound sliding motion of said sleeve and a rotation of the same differentially to operate said flight control surfaces, said last named means including a pair of pulleys rotatably mounted in a fixed position, a complementary set of pulleys rotatably mounted to slide with the sleeve and vary the separation of the two sets of pulleys, cables passing over both sets of pulleys, one end of the cables being anchored on the slidable pulleys and the other end leading to the flight control surfaces, a third set of pulleys providing a guide for the cables, and gears associated with said shaft and slidable pulleys oppositely rotating said pulleys.

6. A combined flight and ground control for airplanes comprising: a rotatable shaft, means including reduction gearing transmitting rotary motion of said shaft to one or more ground wheels for steering same, manually operated means to rotate said shaft including a sleeve slidably but non-rotatably mounted on said shaft, and means coupled with said sleeve transmitting a simple sliding motion of said sleeve to operate flight control surfaces with identical movements or transmitting a compound sliding motion of said sleeve and a rotation of the same differentially to operate said flight control surfaces, said last named means including a pair of pulleys rotatably mounted in a fixed position, a complementary set of pulleys rotatably mounted to slide with the sleeve and vary the separation of the two sets of pulleys, cables passing over both sets of pulleys one end of the cables being anchored on the slidable pulleys and the other end leading to the flight control surfaces, a third set of pulleys providing a guide for the cables, and gears associated with said shaft and slidable pulleys oppositely rotating said pulleys.

7. A control for wheeled airplanes comprising a rotatable shaft, a pinion keyed to the shaft, a ring gear concentric to the pinion and fixedly mounted on the airplane frame structure, complementary gears meshing with pinion and ring gear, means transmitting travel of said complementary gears around said ring gear to bell cranks on the airplane wheels, a sleeve slidably but non-rotatably mounted on the shaft, a beveled gear keyed upon the sleeve, complementary beveled gears mounted on fixed axes on the sleeve and meshing with the first gear for opposite rotation thereby, pulleys mounted on said complementary gears, and cables anchored to said pulleys and leading to flight control surfaces.

8. A flight control for airplanes comprising a rotatable member longitudinally slidable relative to the airplane frame structure, a bevel gear fixed to the member, complementary beveled gears meshing with said first gear and means mounting said complementary beveled gears on said member for longitudinal movement therewith, and with their axes normal thereto, said means being rotatable relative to said member and held against rotating relative to the airplane frame structure, an oscillatable member secured to each gear, and means anchored to said oscillatable members and leading to flight control surfaces, whereby rotation of said member imparts certain movements to said control surfaces and longitudinal movements of said member imparts different movements to said control surfaces.

DANIEL R. ZUCK.

REFERENCES CITED

The following references are of record in the file of this patent:

UNITED STATES PATENTS

| Number | Name | Date |
|---|---|---|
| 1,747,344 | Bell | Feb. 18, 1930 |
| 1,747,251 | Langdon | Feb. 18, 1930 |
| 2,110,516 | Weick | Mar. 8, 1938 |
| 2,172,813 | Waterman | Sept. 12, 1939 |
| 2,173,538 | McKellar | Sept. 19, 1939 |
| 1,820,906 | Bowers | Sept. 1, 1931 |
| 1,644,222 | Baker | Oct. 4, 1927 |

FOREIGN PATENTS

| Number | Country | Date |
|---|---|---|
| 420,752 | France | Dec. 2, 1910 |